Feb. 24, 1970  T. H. LEACH  3,497,109
APPARATUS FOR DISPENSING FEED
Filed June 5, 1967  2 Sheets-Sheet 1
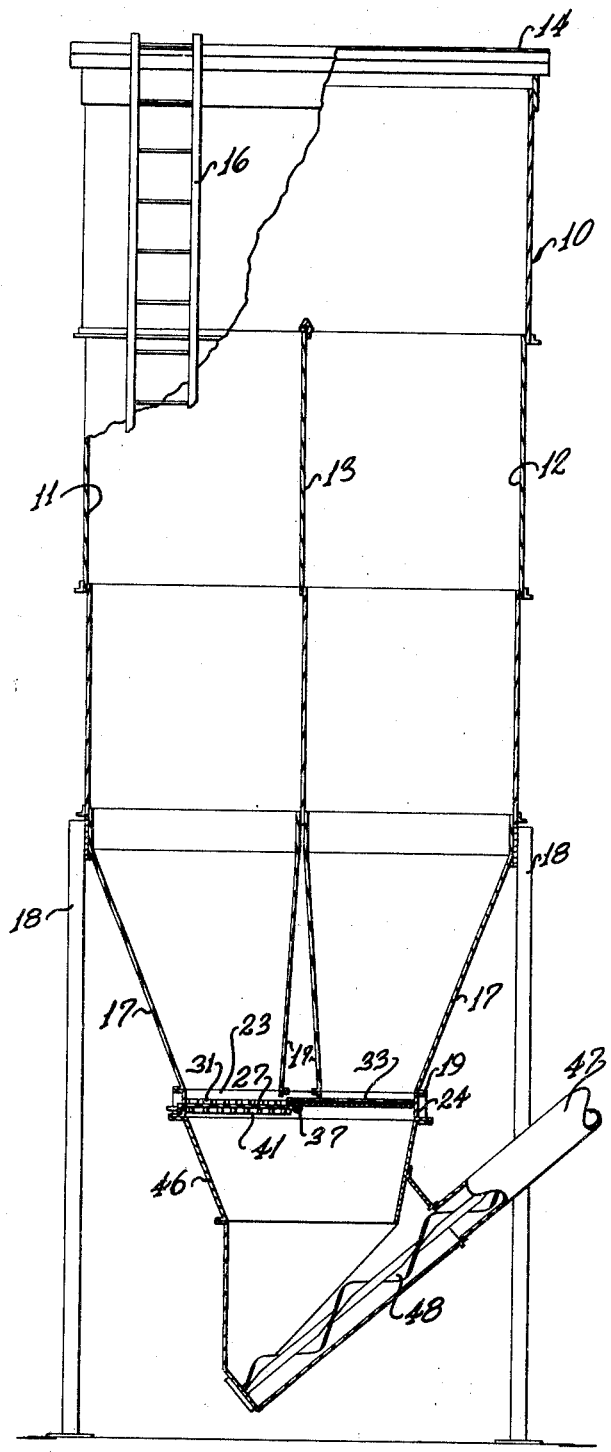
Fig.1
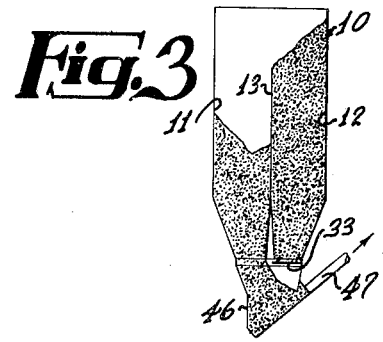
Fig.3
Fig.4
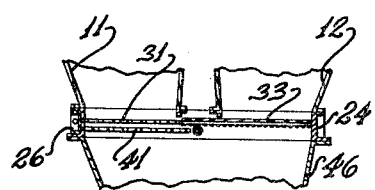
Fig.2
INVENTOR.
Thurman H. Leach
BY
Jennings, Carter + Thompson
Attorneys

United States Patent Office

3,497,109
Patented Feb. 24, 1970

3,497,109
APPARATUS FOR DISPENSING FEED
Thurman H. Leach, P.O. Box 1010,
Gadsden, Ala. 35902
Filed June 5, 1967, Ser. No. 643,686
Int. Cl. B65d 47/20; A01k 5/00
U.S. Cl. 222—144.5                                4 Claims

ABSTRACT OF THE DISCLOSURE

Apparatus for dispensing feed having two feed compartments which communicate with a common discharge boot. A sliding gate permits discharge of feed alternately from one compartment and then the other and a removable gate prevents discharge of feed from one of the feed compartments to interrupt all flow of feed to the boot during cleaning and repair of the boot, the gates being supported by vertically corrugated guide members.

BACKGROUND OF THE INVENTION

Heretofore in the art to which my invention relates, difficulties have been encountered in removing residual materials which stick to or adhere to the sides of feed bins due to the fact that the bin had to be refilled before the bin was completely emptied in order to assure that a continuous supply of feed was provided for the livestock, such as chickens and the like. The need for effective means for thoroughly cleaning the feed bin each time it is empty is especially necessary today with the newly developed ingredients which are added to the feed. Not only do such additives have a short life, but stale feed or molty feed adversely affects the production of eggs and also adversely affects the growth of broilers in a definite manner.

Periodically it is necessary to feed broilers and/or layers medicated feed when illness or stress is encountered by the flock. My improved feed bin, with one side thereof either empty or nearly empty, is an ideal receptacle for this medicated feed which can be delivered in bulk rather than in bags, as is the usual practice.

BRIEF SUMMARY OF INVENTION

To provide a continuous supply of feed and at the same time provide means for removing residual amounts of feed adhering to the empty feed bin, I provide a pair of feed compartments which communicate at their lower ends with a common discharge boot. A closure member is adapted to close the lower ends of the compartments alternately whereby feed can be fed from one compartment until that compartment is empty and then the feed is fed from the other compartment. A removable closure member is adapted to close the discharge end of one of the compartments whereby all flow of feed from both compartments is stopped, thus permitting the discharge boot to be cleaned or repaired.

Apparatus embodying features of my invention is illustrated in the accompanying drawings, forming a part of this application, in which:

FIG. 1 is a vertical sectional view through the feed compartments and the discharge boot, showing an upper portion of the apparatus in elevation and showing the removable closure member in place whereby the discharge ends of both compartments are closed;

FIG. 2 is a fragmental view showing the connection between the feed compartments and the discharge boot and showing the apparatus in position for discharging feed from one compartment;

FIG. 3 is a diagrammatic view showing the feed being discharged from one feed compartment while the discharge end of the other compartment is closed;

FIG. 4 is a diagrammatic view, corresponding to FIG. 3 but showing the feed being discharged from the other compartment.

Figure 5:
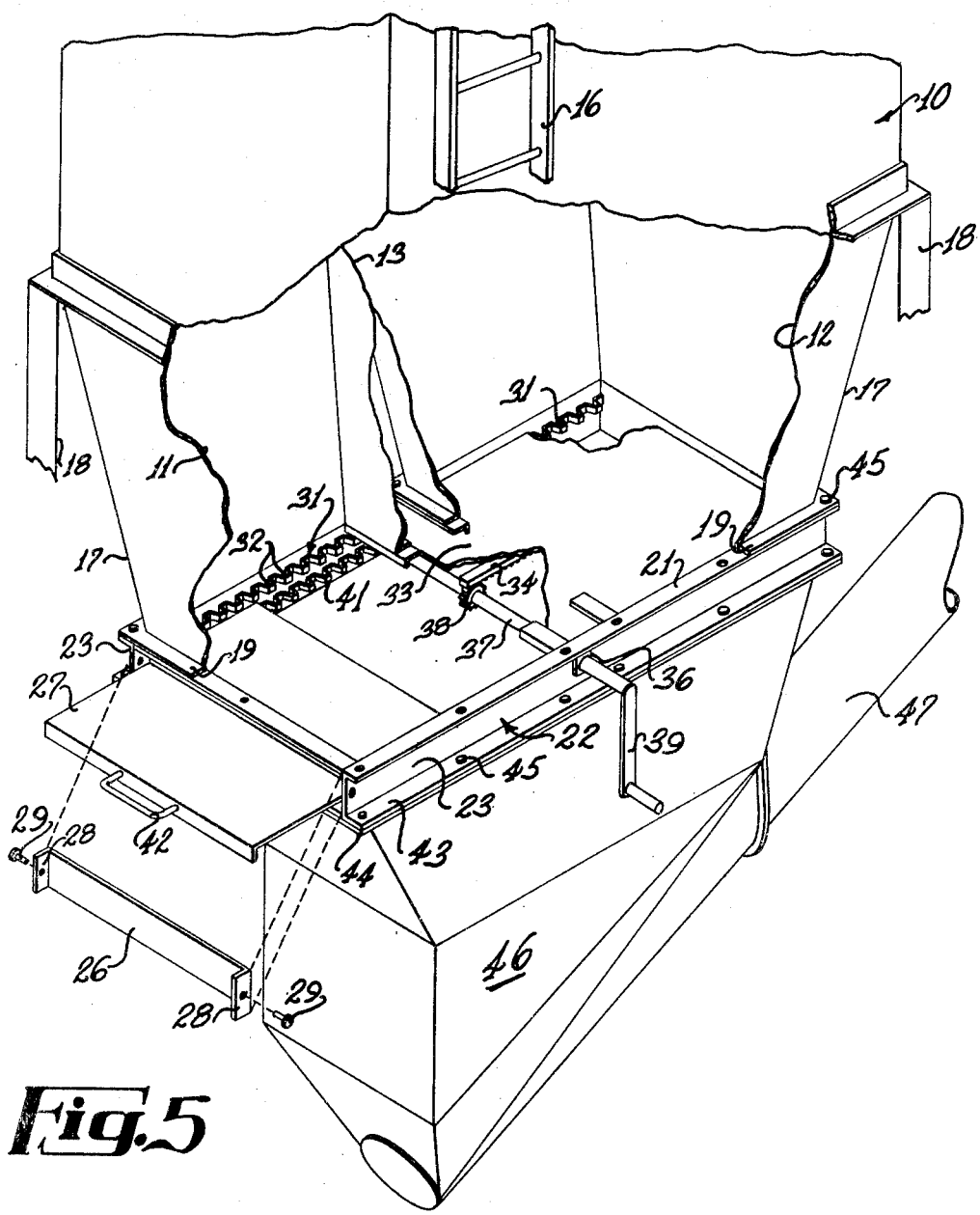
FIG. 5 is an enlarged, fragmental, perspective view, parts being broken away and removed, for the sake of clarity.

Referring now to the drawings for a better understanding of my invention, I show a feed bin indicated generally at 10 which comprises separate compartments 11 and 12. As shown in FIG. 1, a vertical partition wall 13 divides the bin 10 into the separate compartments leaving the upper portion of the bin 10 unseparated, whereby feed may be introduced into a common inlet for both compartments 11 and 12. The upper end of the bin 10 is closed by a removable cover member 14. A ladder 16 is mounted at one side of the bin 10 whereby a person can climb to the top of the bin for opening the closure member 14 whereby the interior of the bin may be inspected and cleaned. The lower end of the bin 10 is provided with downwardly tapered portions 17 which facilitate flow of material and separate the discharge ends of the compartments. Suitable vertical support members 18 support the bin in an upright position.

The lower end of the bin 10 is provided with outturned flanges 19 which are secured to outturned flanges 21 of a valve housing indicated generally at 22. As shown in FIG. 5, the valve housing 22 is generally rectangular and is provided with side members 23 and end closure members 24 and 26. The end closure member 26 is detachably connected to the ends of the side members 23, as shown in FIG. 5, whereby it may be readily removed for inserting a removable plate-like closure member 27. The end member 26 is provided with outturned flanges 28 having suitable openings therein for receiving retaining screws 29 whereby the end closure member 26 may be secured in place.

Secured to the inner surface of each of the side members 23 of the valve housing 22 are elongated guide members 31 having longitudinally spaced, outwardly projecting portions 32 which are spaced from the side members 23. As shown in FIG. 5, the material forming the outwardy projecting portions 32 extends in a vertical plane to define vertically extending corrugations which provide a ledgeless guide member. Mounted for sliding movement along the upper edges of the vertically extending corrugations of the elongated guide members 31 is a plate-like valve member 33 which is adapted to move from the position shown in FIGS. 1, 2, 3 and 5 to the position shown in FIG. 4. Secured to the under surface of the plate-like valve member 33 and extending parallel to the guide members 31 and parallel to the direction of movement of the member 33 is an elongated rack 34. Mounted for rotation in suitable bearing members 36 carried by the side members 23 of the valve housing 22 is a shaft 37 which carries a pinion 38 that meshes with the under surface of the rack 34 to thus move the plate-like valve member 33 selectively to the positions shown in FIGS. 3 and 4. Secured to the outer end of the shaft 37 is an operating handle 39 for rotating the shaft whereby the valve member 33 is moved to selected positions.

Secured to the inner surface of each of the side members 23 in vertically spaced relation below the elongated guide members 31 are elongated guide members 41 which are identical in structure to the guide members 31 whereby they provide ledgeless guideways for supporting the plate-like member 27 which is adapted to close the compartment 11 whereby both compartments 11 and 12 may be closed at the same time to prevent discharge of materials from either compartment. The plate-like member 27 is provided with a handle 42 whereby it may be readily inserted upon removal of the closure member 26.

As shown in FIG. 5, the valve housing 22 is provided with lower outturned flanges 43 which are adapted to engage outturned flanges 44 carried by a discharge boot 46. The flanges 21 and 43 of the discharge housing 22 are secured to the flanges 19 and 44, respectively, by suitable retaining screws 45 whereby the discharge housing 22 rigidly connects the compartments 11 and 12 to the discharge boot 46. The discharge boot 46 is provided with a suitable discharge conduit 47 and materials are conveyed from the discharge boot 46 outwardly through the conduit 47 by suitable means, such as an auger 48. While I have shown the material as being removed from the boot 46 by an auger 48, it would be apparent that other suitable means may be employed, such as a chain or the like.

From the foregoing description, the operation of my improved apparatus will be readily understood. The cover 14 is lifted and feed is introduced into the bin 10 to fill both compartments 11 and 12 and the space above the partition wall 13. During the filling operation, the plate-like valve member 33 is in the position shown in FIG. 3 whereby material is introduced into the boot 46 at the time the compartments are filled. Feed is removed from the boot 46 by the conveyor 48. After the feed has all been removed from the compartment 11, the valve plate member 33 is moved by the rack and pinion to the position shown in FIG. 4 whereby feed is then free to flow downwardly through the discharge end of compartment 12 into the boot 46. Prior to introducing a new batch of feed into the compartment 11, the operator climbs up ladder 16 to the top of bin 10 and then lifts the cover 14 whereby an inspection can be made of the interior of the empty compartment 11. If any feed remains sticking to the sides or hung on any bolts or crevices, the operator sweeps the feed therefrom whereupon it falls onto the valve plate 33 so that it is the first feed to be discharged upon reopening the discharge end of the compartment 11. At the time compartment 11 is being cleaned, feed is discharged through the lower end of compartment 12 whereby there is no interruption in the supply of feed to the hopper 46 while the residual amounts of feed are removed from the compartment 11. After the plate-like valve 33 has been moved by the rack and pinion to the position shown in FIG. 4, the compartment 12 contains a supply of feed which extends to the top of the partition wall 13 in addition to the feed above the partition wall 13 which is represented by the angle of repose, as shown in FIG. 3.

After the compartment 11 has been thoroughly cleaned, feed is again introduced into the top of the bin 10 to fill compartment 11. When compartment 12 becomes empty, the crank arm 39 is again rotated in a direction to move the valve plate 33 back to the position shown in FIG. 3 whereupon the feed is then discharged from the lower end of compartment 11 into the discharge boot 46. With the compartment 12 empty and the valve plate 33 in the position shown in FIG. 3, the operator lifts the cover 14 and cleans the compartment 12 to remove any residual amounts of feed therefrom as described above whereby a completely clean compartment is then provided for receiving a new supply of feed. This procedure is repeated whereby feed is alternately discharged from one compartment and then the other. Each time a compartment becomes empty, it is cleaned by lifting the cover 14 as described above and then a new supply of fresh feed is introduced into the cleaned compartment.

When it is desirable to clean out or repair the discharge boot 46, the crank arm 39 is rotated in a direction to move the valve plate 33 toward the left to the position shown in FIG. 4. The end cover member 26 is then removed by removing the screws 29. The removable valve plate 27 is then inserted whereby it is supported by the elongated guide members 41. The removable valve plate 27 moves beneath the load bearing valve plate 33 whereby there is no effort involved in inserting the removable plate 27. After the plate 27 is moved into position, the crank arm 39 is rotated in a direction to return the valve plate 33 to the position shown in FIG. 3 to thus completely seal off the flow of feed from the bin 10 into the boot 46. That is, with the removable plate 27 and the valve plate 33 in the position shown in FIG. 1, the removable valve member 27 closes the lower end of compartment 11 while the valve plate member 33 closes the lower end of compartment 12. After the discharge boot 46 has been cleaned out or repaired, the handle 39 is rotated in a direction to move the valve plate 33 back over the removable valve plate 27 whereupon the valve plate 27 is removed and the end cover member 26 is then replaced on the discharge housing 22 by means of the retaining screws 29.

From the foregoing, it will be seen that I have devised improved apparatus for dispensing feed whereby feed is continuously supplied to a discharge boot and at the same time means is provided for thoroughly cleaning each compartment of the feed bin after it is emptied. By providing a removable closure member which permits the discharge ends of both compartments 11 and 12 to be closed, the discharge boot may be emptied for cleaning or repair at any time regardless of the amount of feed in the compartments 11 and 12. Furthermore, by providing ledgeless guide members for supporting the valve plate 33 and the removable valve plate 27, a minimum of feed clings to the guide members whereby the guide members are easily maintained in a clean condition.

While I have shown my invention in but one form, it will be obvious to those skilled in the art that it is not so limited, but is susceptible of various other changes and modifications without departing from the spirit thereof.

What I claim is:

1. Apparatus for dispensing feed comprising:
   (a) a first feed compartment,
   (b) a second feed compartment,
   (c) a common discharge boot communicating selectively with the discharge ends of said first and second feed compartments,
   (d) a closure member movable selectively from a first position to close the discharge end of said first compartment and open the discharge end of said second compartment to a second position to close the discharge end of said second compartment and open the discharge end of said first compartment,
   (e) means to move said closure member selectively to said first position and to said second position so that feed is discharged alternately and selectively from only said first compartment and said second compartment,
   (f) means to discharge feed from said boot, and
   (g) a removable closure member adapted for movement to a position to close the discharge end of at least one of said compartments so that the discharge ends of both of said compartments can be closed at the same time to interrupt all flow of feed to said boot whereby said boot can be cleaned and repaired.

2. Apparatus for dispensing feed as defined in claim 1 in which the closure member comprises:
   (a) parallel side members connecting said compartments to said boot,
   (b) a plate-like valve member movable to said first position and said second position,
   (c) elongated guide members secured to each of said side members and having longitudinally spaced projections extending inwardly beneath adjacent sides of said plate-like valve member with the material forming said projections extending in a generally vertical plane to define vertically extending corrugations having upper edges which provide guides for said plate-like valve member, and (d) end members closing the ends of said valve housing.

3. Apparatus for dispensing feed as defined in claim 2 in which other ones of said elongated guide members are secured to said side members in vertically spaced relation to the first mentioned guide members and a removable, plate-like valve member is adapted for movement between said vertically spaced guide members with the lowermost guide members supporting said removable, plate-like valve member.

4. Apparatus for dispensing feed as defined in claim 3 in which at least one of said end members is removable for inserting said removable, plate-like valve member.

References Cited

UNITED STATES PATENTS

| | | | |
|---|---|---|---|
| 139,973 | 6/1873 | Replogle | 222—144.5 |
| 748,059 | 12/1903 | Ferrell | 222—561 X |
| 1,205,431 | 11/1916 | Burns | 222—145 |
| 2,537,494 | 1/1951 | Venske et al. | 119—56 |
| 2,735,583 | 2/1956 | Misch | 222—129 |
| 3,215,314 | 11/1965 | Haley | 222—136 |

ROBERT B. REEVES, Primary Examiner

F. R. HANDREN, Assisant Examiner

U.S. Cl. X.R.

119—56; 222—485, 561